Jan. 13, 1953   J. W. BRUBAKER ET AL   2,625,045
GYRO BEARING

Filed May 23, 1949

INVENTORS
JOHN W. BRUBAKER
MANUEL C. SANZ
CHARLES N. SCULLY

BY William R. Lane
ATTORNEY

Patented Jan. 13, 1953

2,625,045

UNITED STATES PATENT OFFICE 2,625,045

GYRO BEARING

John W. Brubaker, Palos Verdes Estates, Manuel C. Sanz, Los Angeles, and Charles N. Scully, Pasadena, Calif., assignors to North American Aviation, Inc.

Application May 23, 1949, Serial No. 94,762

6 Claims. (Cl. 74—5.1)

This invention pertains to supporting a gyroscope or similar mass. It pertains particularly to a method of supporting and encasing a gyro without the use of conventional mechanical bearings.

It is an object of this invention to provide means for supporting a gyroscope which is substantially frictionless.

It is another object of this invention to provide a fluid bearing for a gyroscope which is adapted to cage the gyro when it is not in use.

It is a further object of this invention to provide a liquid bearing device with a fluid medium having the same density as the device to be borne on the bearing.

Other objects of invention will become apparent from the following description taken in conjunction with accompanying drawings in which.

Figure 1:
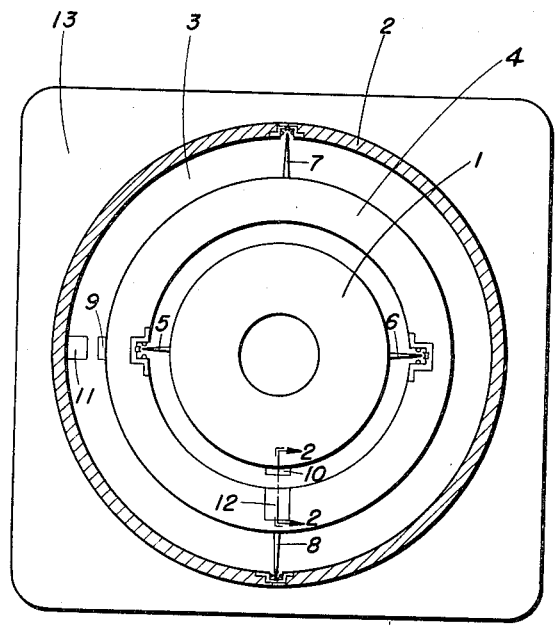
Fig. 1 is a plan view of the invention partly in section.

Referring to Fig. 1, a gyroscope 1 floats in casing 2 containing fluid medium 3 and gimbal ring 4. Gimbal ring 4 supports gyro 1 on jewelled needle bearings 5 and 6 and is supported on jewelled needle bearings 7 and 8. These needle bearings are very small in comparison to the gyroscope and could not support the gyroscope without the floating action of fluid medium 3. Position pickoffs are provided between the gimbal ring and the gyro and between the gimbal ring and the casing. These pickoffs comprise soft iron pieces 9 and 10 and "E" elements 11 and 12. Casing 2 is solidly supported on platform 13 having two degrees of angular freedom corresponding to the angular freedom of the gyroscope.

In order that gyroscope 1 may be successfully suspended in casing 2 without imposing loads on the needle bearings, it is necessary that the density of medium 3 be precisely equal to the density of gyro 1. The average density of conventional gyroscopes has been found to be about 6.0. It is therefore required that medium 3 have a density of the same magnitude. It is to be understood the design of gyro 1 may be varied somewhat to attain slight variations in average density. The problem, therefore, is to obtain a substance which is fluid at the operating temperatures of the gyro, which has a density of about 6.0, and which solidifies at a relatively high temperature so that the gyroscope may be caged without the use of mechanical devices when it is not in use. It can readily be seen that liquids having densities of 2.5 to 3.5 such as the halogenated hydro-carbons, methylene iodide, acetylene tetrabromide, and methylene bromide, would be unsatisfactory from the standpoint of density. Likewise, mercury with a density of 13.0 proves undesirable because of its unnecessarily high density and also because of its toxicity. In short, liquids of the halogenated hydro-carbon group have such low densities as to make the gyroscope inordinately large and mercury is so dense that the gyroscope and casing using mercury as a flotation medium are impracticably heavy.

As a flotation medium, this invention employs the element gallium alloyed with tin in an amount up to twelve percent of the alloy. The percentage of tin included in the alloy is chosen so as to obtain the optimum melting point. If under the design conditions of the gyroscope, it is feasible to lower its temperature only to about 29.8° C. when not in use, the gyroscope may be caged by the solidification of pure gallium which melts at 29.8° C. If the operating temperature, however, under the design conditions specified for the gyroscope, are lower than the melting point for gallium, an alloy comprising up to twelve percent tin may be used, whereupon, the caging point or melting point of the alloy is lowered to 15° C. Other alloying metals such as indium, cadmium, or bismuth may also be used with similar depression of melting point. Of course, the gyroscope must be operated for a "warm-up" period prior to operation in order to liquify the bearing. The solidification of the alloy upon lowering of the temperature is a distinct advantage since the gyroscope and associated apparatus may be handled less carefully than if the gyroscope were at all times suspended in the fluid.

Gallium and the gallium-tin alloys herein specified have the specific advantage that their densities are approximately 6.0. This factor allows for a lighter more compact gyroscope support scheme than would result from the use of any of the other fluids referred to hereinbefore. Furthermore, gallium is chemically stable, non-corrosive and non-toxic. It can therefore be handled by relatively unskilled personnel.

Since the density of gallium is approximately 6.0 a gyroscope can be readily designed which has a density exactly matching the density of the flotation medium. No particular consideration need be given to enlarging the gyroscope to displace a greater volume of liquid to lower its average density because the average density of a conventional gyroscope designed for conventional mechanical supports is approximately 6.0.

Figure 2:
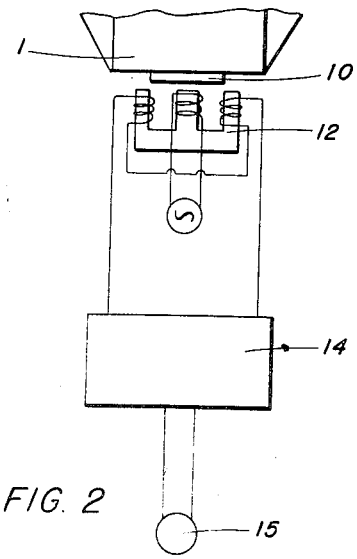
Fig. 2 is an elevational view of the device shown in Fig. 1 taken at 2—2 in Fig. 1.

Referring now to Fig. 2, "E" pickoff 12 and soft iron slug 10 are shown in position to detect relative angular movement between the gyroscope and the gimbal ring. Alternating current is furnished to the center pole of the "E" pickoff and the windings on the extreme poles are connected to a discriminator-amplifier 14 which drives servomotor 15 which is used to correct the angular attitude of platform 13 to conform to that of the gyroscope. In a similar manner pickoff elements 9 and 11 are used to control the angular attitude of the platform to conform to that of the gyroscope about an axis normal to that controlled by servomotor 15.

When the gyroscope is not in operation the gallium or gallium alloy solidifies around the gyroscope and gimbal ring, thus "freezing" or caging them in position. In this way, no appreciable loads are ever carried by the delicate jewelled bearings 5, 6, 7 and 8. These bearings may be precision made and adjusted to have very slight friction. And when the gallium is solid, the device may be subjected to relatively rough treatment and large accelerations without damage to the jewelled bearings.

The gallium or alloy is retained in casing 2, which is a fluid tight container of any convenient shape to allow angular freedom for the gimbal ring and gyroscope. When the gyroscope is started, the heat generated internally by its motor and by the flow of electricity through its motor coils suffices to melt the gallium or gallium alloy and provide the necessary angular freedom.

Although the invention has been described and illustrated in detail, it is to be clearly understood that the same is by way of illustration and example only and is not to be taken by way of limitation, the spirit and scope of this invention being limited only by terms of the appended claims.

We claim:

1. Means for supporting a gyroscope comprising a casing having the same general shape as said gyroscope and a floating medium of gallium between said gyroscope and said casing to thereby float said gyroscope in said casing.

2. Means for supporting a gyroscope comprising a casing having the same general shape as said gyroscope and a floating medium of a gallium-tin alloy containing up to 12% tin between said gyroscope and said casing and having an average density equal to that of said gyroscope to thereby float said gyroscope in said casing.

3. A device as recited in claim 2 in which said floating medium comprises gallium alloyed with at least one other metal selected from the group consisting of tin, indium, cadmium and bismuth.

4. Means for supporting a gyroscope with a plurality of degrees of angular freedom when said gyroscope is in operation and no degree of angular freedom when said gyroscope is not in operation, comprising a fluid container larger than said gyroscope, a mechanical gimbal system between said container and said gyroscope adapted to predeterminately resist the angular freedom of said gyroscope and a fluid medium of gallium between said container and said gyroscope.

5. Means for supporting a gyroscope with a plurality of degrees of angular freedom when said gyroscope is in operation and with no degree of angular freedom when said gyroscope is not in operation, comprising a fluid container larger than said gyroscope, a mechanical gimbal system between said container and said gyroscope adapted to predeterminately restrict the gimbal system of said gyroscope and a fluid medium of gallium alloyed with at least one other metal selected from the group consisting of tin, indium, cadmium and bismuth between said container and said gyroscope and having a density equal to the average density of said gyroscope and a melting point lower than the operating temperature of the gyroscope but higher than the temperature at which the gyroscope would be maintained under non-operating conditions.

6. A device as recited in claim 5 in which said fluid medium is a gallium-tin alloy containing up to 12% tin.

JOHN W. BRUBAKER.
MANUEL C. SANZ.
CHARLES N. SCULLY.

REFERENCES CITED

The following references are of record in the file of this patent:

UNITED STATES PATENTS

| Number | Name | Date |
|---|---|---|
| 1,743,533 | Davis | Jan. 14, 1930 |
| 2,271,315 | Sperry | Jan. 27, 1942 |